United States Patent
Yamada

(10) Patent No.: US 9,666,421 B2
(45) Date of Patent: May 30, 2017

(54) MASS SPECTROMETRY DATA DISPLAY DEVICE AND MASS SPECTROMETRY DATA DISPLAY PROGRAM

(71) Applicant: SHIMADZU CORPORATION, Kyoto-shi, Kyoto (JP)

(72) Inventor: Yohei Yamada, Kyoto (JP)

(73) Assignee: SHIMADZU CORPORATION, Kyoto-shi (JP)

( * ) Notice: Subject to any disclaimer, the term of this patent is extended or adjusted under 35 U.S.C. 154(b) by 659 days.

(21) Appl. No.: 14/140,722

(22) Filed: Dec. 26, 2013

(65) Prior Publication Data

US 2015/0187553 A1    Jul. 2, 2015

(51) Int. Cl.
*H01J 49/02* (2006.01)
*G06F 3/14* (2006.01)

(52) U.S. Cl.
CPC ............ *H01J 49/02* (2013.01); *H01J 49/025* (2013.01); *G06F 3/14* (2013.01)

(58) Field of Classification Search
CPC ............ G06F 3/14; H01J 49/02; H01J 49/025
See application file for complete search history.

(56) References Cited

U.S. PATENT DOCUMENTS

| | | | | | |
|---|---|---|---|---|---|
| 5,970,424 | A | * | 10/1999 | Kaffka | G01N 21/359 702/28 |
| 7,979,258 | B2 | * | 7/2011 | Goldberg | H01J 49/0009 702/19 |
| 2003/0064527 | A1 | * | 4/2003 | Lubman | C07K 1/36 436/174 |
| 2003/0236634 | A1 | * | 12/2003 | Yoshinari | G06F 19/16 702/23 |
| 2008/0096284 | A1 | * | 4/2008 | Lubman | C07K 1/28 436/86 |
| 2009/0179149 | A1 | * | 7/2009 | Sugiyama | H01J 49/0045 250/282 |
| 2011/0111443 | A1 | * | 5/2011 | Nishimura | G01N 33/6848 435/23 |
| 2013/0073219 | A1 | * | 3/2013 | Vitaletti | G06K 9/00496 702/23 |

FOREIGN PATENT DOCUMENTS

| | | | |
|---|---|---|---|
| JP | 61020854 A | * | 1/1986 |
| JP | 2000-322589 A | | 11/2000 |
| JP | 2005221328 A | * | 8/2005 |

OTHER PUBLICATIONS

Wheleer, Andrew, Using circular dot plots instead of circular histograms—https://andrewpwheeler.wordpress.com/tag/polar-co-ordinates/, Jun. 2013.*

* cited by examiner

*Primary Examiner* — Alexander Satanovsky
*Assistant Examiner* — Lina Cordero
(74) *Attorney, Agent, or Firm* — Sughrue Mion, PLLC

(57) ABSTRACT

A mass spectrometry data display device in which the mass axis (m/z axis) is made into a ring shape and the intensity axis is the radial direction thereof, and peak information (in the drawing, the compound name and structural formula candidates) are arranged in a ring shape in correspondence with the peaks along the outer circumference of the mass spectrum and displayed together therewith on a screen.

18 Claims, 6 Drawing Sheets

MASS SPECTROMETRY DATA DISPLAY DEVICE AND MASS SPECTROMETRY DATA DISPLAY PROGRAM

TECHNICAL FIELD

The present invention relates to a mass spectrometry data display device and mass spectrometry data display program which display a mass spectrum along with information on peaks contained in the mass spectrum.

BACKGROUND ART

In mass spectrometry, a sample is ionized and the ions are separated according to mass (more accurately, according to mass-charge ratio), and an intensity signal corresponding to the number of ions is measured. The measurement results, in which mass is shown on the horizontal axis and signal intensity (generally, relative intensity) on the vertical axis, constitute a mass spectrum.

If the sample molecules have a large molecular weight and a complex structure, sometimes ions of a specified mass are selected as precursor ions (parent ions), and the selected precursor ions are cleaved by CID (collision induced dissociation). The fragment ions produced by cleavage are separated according to mass in the same manner as above, and a mass spectrum based on the fragment ions is generated. This cleavage operation may be performed multiple times, in which case a mass spectrum is acquired at each stage of cleavage. A mass spectrum obtained by repeating the cleavage operation (n−1) times (where n is an integer equal to or greater than 2) is commonly referred to as an "MS$^n$" spectrum."

To analyze a mass spectrum, there is the method of using a mass spectrum library (database). A mass spectrum library includes information on various known compounds, i.e. mass spectrum data obtained when performing mass spectrometry using a predetermined ionization method, as well as information such as compound name, molecular weight, composition formula, structural formula, etc. These mass spectra of known compounds and the measured mass spectrum obtained through measurement are subjected to pattern matching under designated search parameters, and information on known compounds similar to the peak pattern of the measured mass spectrum is obtained.

It is desirable for the information obtained from a mass spectrum library, etc. to be displayed on a screen together with the mass spectrum so as to be easy to understand by the user. A simple display method of this sort includes the method of displaying the mass at the top of all peaks or of representative peaks. Furthermore, although different from mass spectrometry, Patent literature 1 describes a method whereby, when a user moves the cursor of a pointing device such as a mouse over a graph displayed on a screen, numerical values or other detailed information is displayed at the cursor location. Applying the method of Patent literature 1, as shown in FIG. 6, there is the method of displaying peak information (in the drawing, structural formula candidates) for peaks of the mass spectrum designated by the user based on the cursor location.

PRIOR ART LITERATURES

Patent Literatures (Patent literature 1) Japanese Unexamined Patent Application Publication 2000-322589

SUMMARY OF THE INVENTION

Problem to be Solved by the Invention

However, to analyze a mass spectrum, it is necessary to comprehensively evaluate information on multiple peaks rather than just focusing on information for a single peak. Thus, it is desirable to display information for multiple peaks on the graph at the same time, but in the display method of Patent literature 1, only information pertaining to the peak at the cursor location is shown, so comparison with other peaks is not possible. Even if one tries to simultaneously display information for peaks other than that at the cursor location, in cases where a large amount of information is associated with a single peak or where large peaks are clustered together, due to the limited display area, it is difficult to display without overlapping the peaks or other peak information.

The problem to be solved by the present invention consists in providing a mass spectrometry data display device which makes it possible to increase the amount of information that can be displayed on a mass spectrum.

Means for Solving the Problem

The mass spectrometry data display device according to the first invention, made to resolve the aforementioned problem, is a mass spectrometry data display device which displays a mass spectrum on a screen, with one axis as the mass axis and the other axis as the intensity axis, including:

a transformed graph generator which generates a mass spectrum with said mass axis as a ring shape and said intensity axis as the radial direction thereof; and a data display which displays the mass spectrum generated by said transformed graph generator, and displays peak information for peaks contained in said mass spectrum at the outer circumference of said mass spectrum in association with the peaks.

It should be noted that a "mass spectrum" in the present invention includes both mass spectra which do not involve a cleavage operation and mass spectra which involve a cleavage operation (MS$^n$ spectrum).

Furthermore, the mass spectrometry data display device according to the second invention, made to resolve the aforementioned problem, is a mass spectrometry data display device which displays a mass spectrum on a screen, with one axis as the mass axis and the other axis as the intensity axis, characterized in that it comprises:

a transformed graph generator which generates a mass spectrum with said mass axis oriented in the vertical direction of said screen and said intensity axis oriented in the horizontal direction or diagonal direction of said screen; and a data display which displays the mass spectrum generated by said transformed graph generator, and displays peak information for peaks contained in said mass spectrum at the left and/or right of said mass spectrum in association with the peaks.

On the screen of a personal computer, character information is normally displayed from left to right and image information is displayed in horizontally long fashion. The same is true when peak information is displayed as character information and as image information for structural formula candidates, etc. on a mass spectrum. In conjunction with this, since the peaks of the mass spectrum are also arranged side by side from left to right, when information on multiple peaks is to be displayed simultaneously on the screen, the problem occurs that peaks and peak information or items of peak information overlap each other. The present inventor conceived of the above invention in view of this problem.

In the present invention, based on the aforesaid configuration, the peaks of the mass spectrum are arranged in a ring shape or in the vertical direction of the screen, and peak information is also arranged in a ring shape or in the vertical direction of the screen in correspondence to the arrangement of the peaks. Thus, even if individual items of peak information are displayed in horizontally long fashion, they can be displayed simultaneously on the screen without overlapping each other or the peaks.

Effect of the Invention

The mass spectrometry data display device according to the present invention makes it possible to increase the amount of information which can be displayed on the mass spectrum, thus making it possible to simultaneously display peak information for multiple peaks. Therefore, the user is able to comprehensively evaluate the information for multiple peaks, making it easier to analyze the mass spectrum.

DETAILED DESCRIPTION OF THE EXEMPLARY EMBODIMENT

Figure 1:
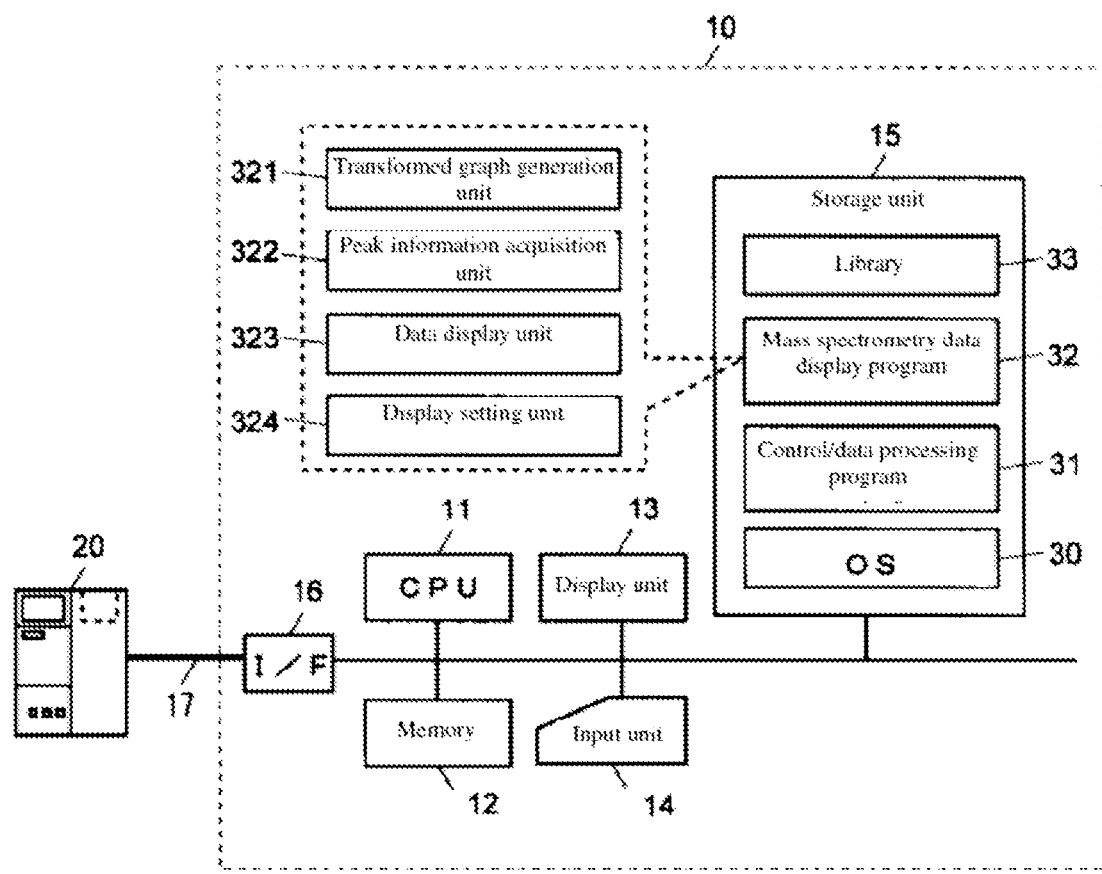
FIG. 1 A simplified diagram of an example of embodiment of the mass spectrometry data display device according to the present invention.

The general configuration of the mass spectrometry data display device (hereinafter abbreviated as "display device") 10 according to the present invention will be described with reference to FIG. 1. The display device 10 of the present example of embodiment essentially consists of a computer, in which a CPU (Central Processing Unit) 11, memory 12, a monitor (display unit) 13 comprising an LCD (Liquid Crystal Display), etc., an input unit 14 comprising a keyboard, mouse, etc., and a storage unit 15 comprising a large capacity storage device such as a hard disk, are connected to each other.

Display device 10 comprises an interface (I/F) 16 for managing direct connection or connection via a network such as a LAN (Local Area Network) to a mass spectrometry device 20, and is connected to the mass spectrometry device 20 via a communication line 17 from I/F 16. It will be noted that display device 10 need not be limited to a form connected to the mass spectrometry device 20 via I/F 16, and may also be integrated with the mass spectrometry device 20.

Storage unit 15 stores an OS (Operating System) 30, a control/data processing program 31, a mass spectrometry data display program (hereinafter abbreviated as "display program") 32 and a library (mass spectrum library) 33. The control/data processing program 31 is a program for controlling the analytical operation of the mass spectrometry device 20 and performing data processing of the analytical data outputted from the mass spectrometry device 20. The display program 32 is a program for generating a mass spectrum graph as shown in FIGS. 2 through 5 based on the analytical data which has undergone data processing by the control/data processing programs 31 and displaying it together with peak information for the peaks on the display screen of display unit 13. These programs operate in software by being executed by CPU 11. Furthermore, peak information for various known compounds is registered in library 33.

It will be noted that in the present example of embodiment, the control/data processing program 31 and the display program 32 are different programs, but they may also be integrated. Furthermore, these programs may be incorporated into the OS 30.

Figure 3:
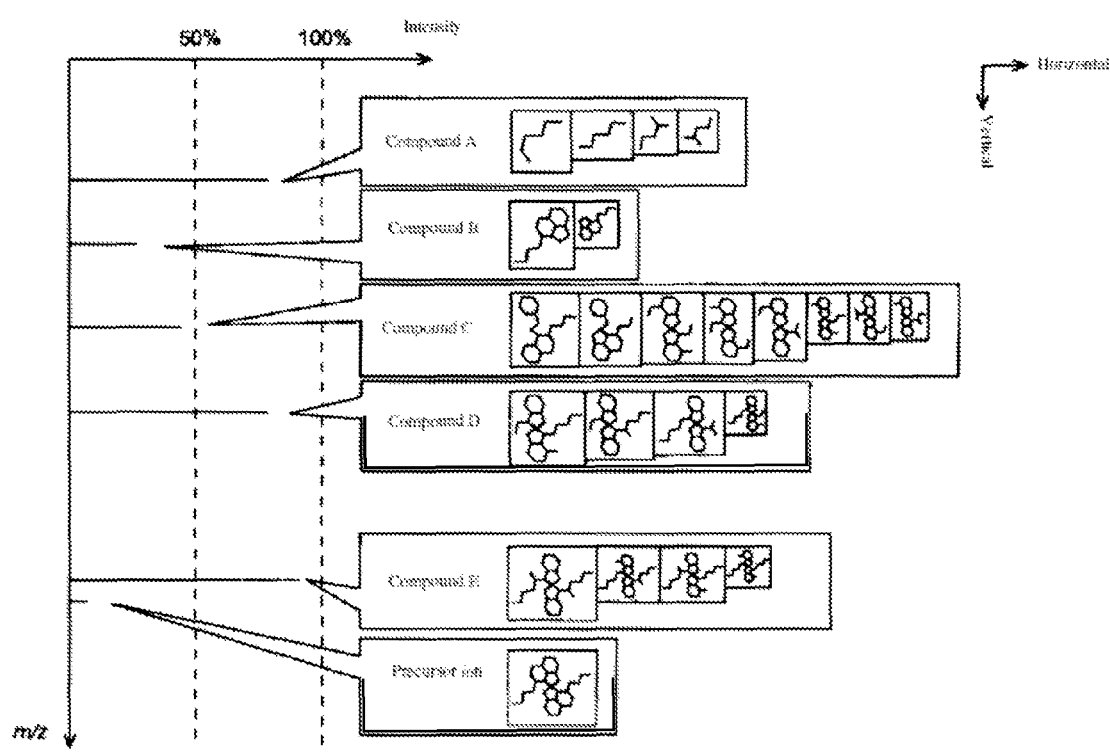
FIG. 3 Another mass spectrum and peak information display example for the mass spectrometry data display device of the present example of embodiment.
Figure 4:
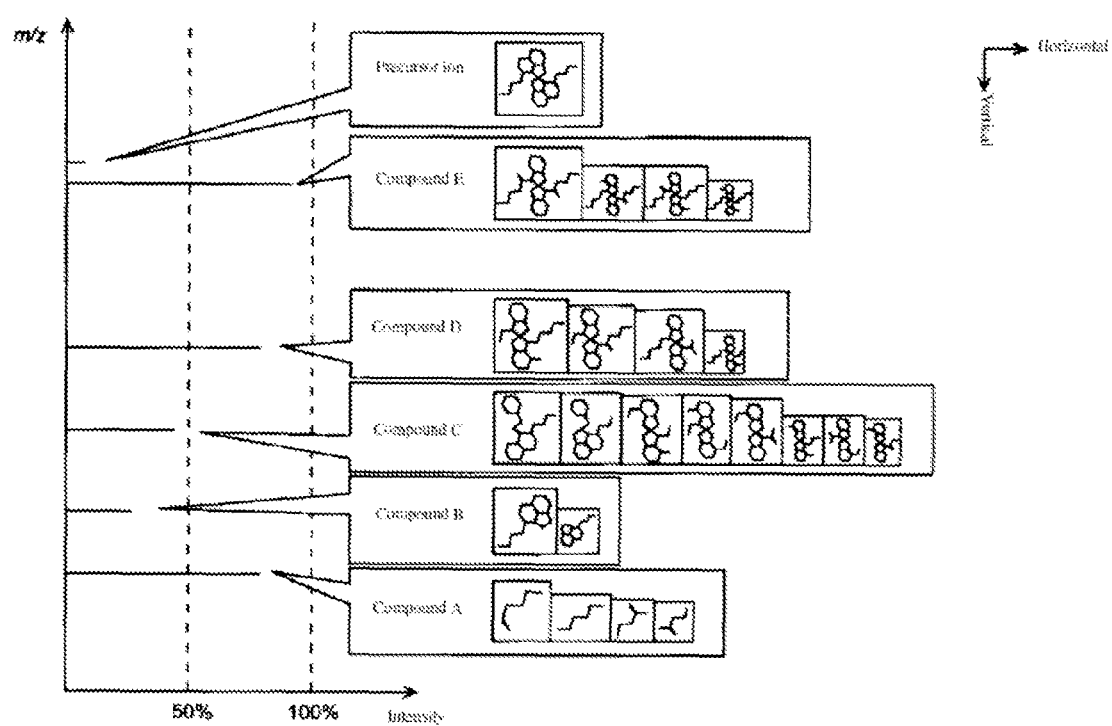
FIG. 4 Another mass spectrum and peak information display example for the mass spectrometry data display device of the present example of embodiment.
Figure 5:
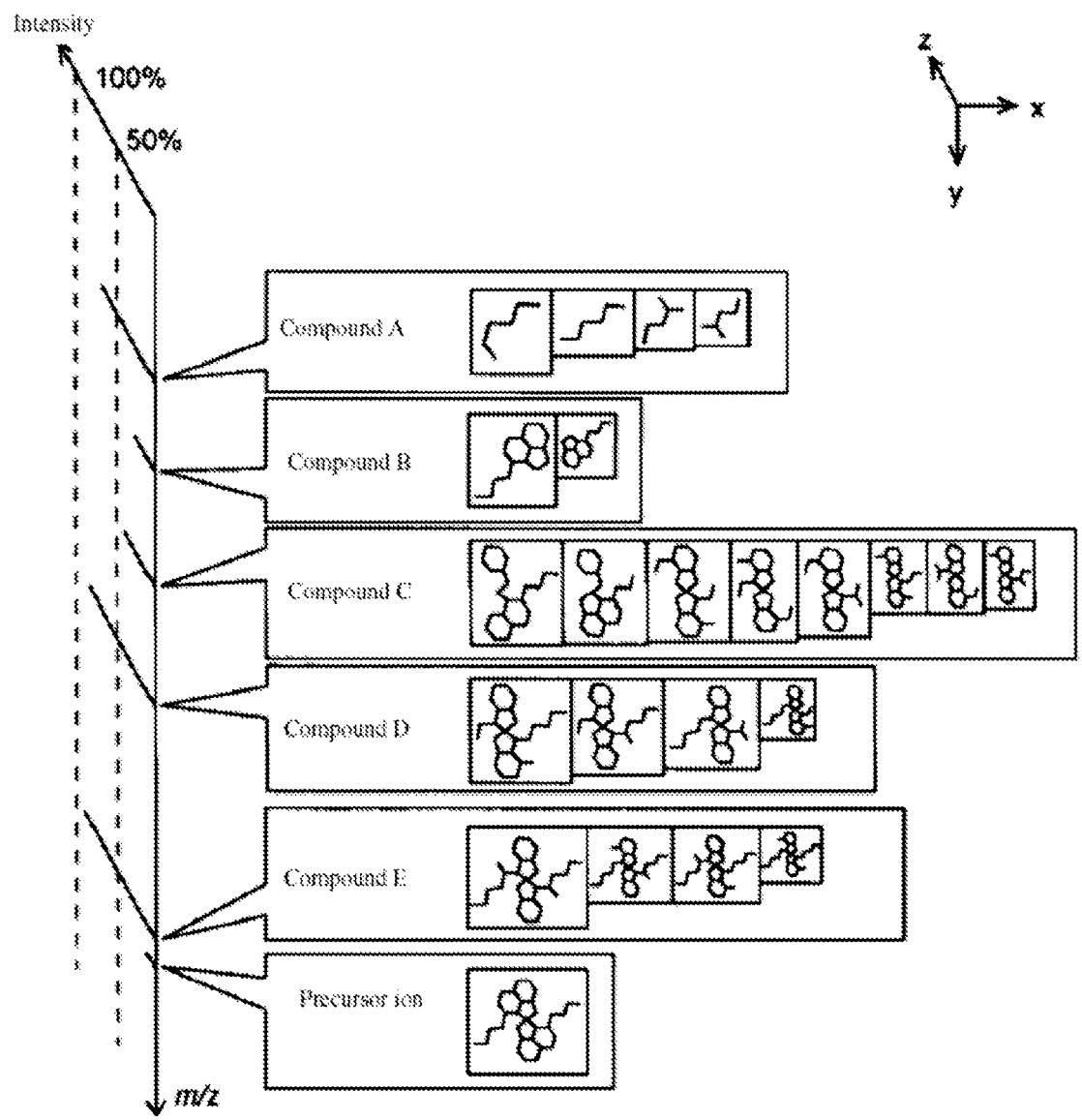
FIG. 5 Another mass spectrum and peak information display example for the mass spectrometry data display device of the present example of embodiment.
Figure 6:
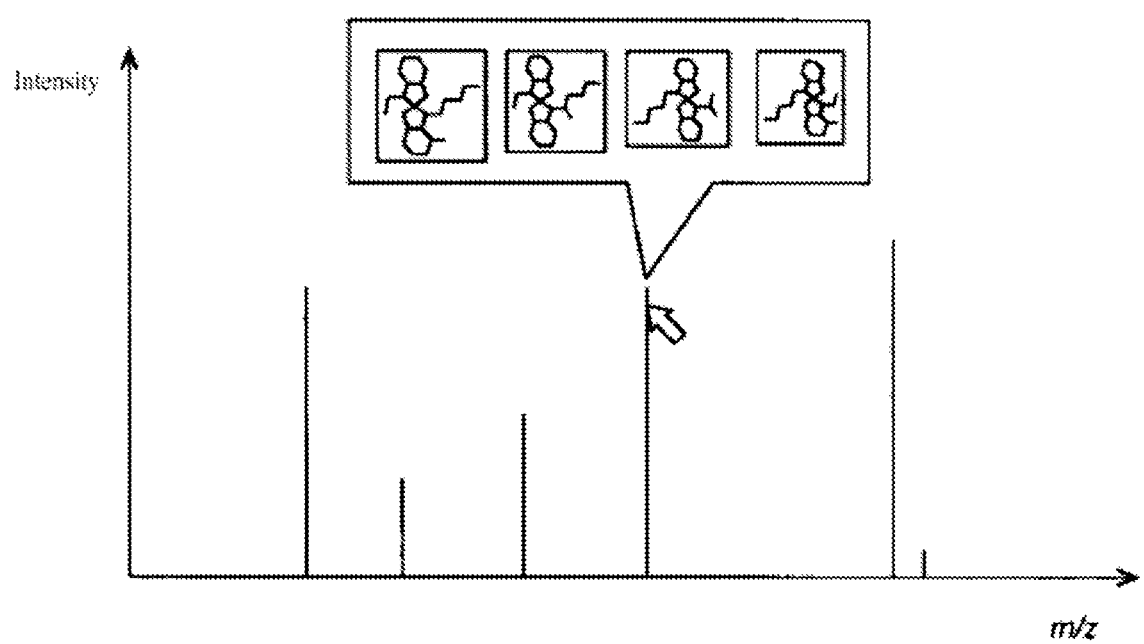
FIG. 6 A conventional display example of peak information on a mass spectrum.

The display program 32 in the present example of embodiment functions as transformed graph generation unit 321, peak information acquisition unit 322, data display unit 323 and display setting unit 324. The transformed graph generation unit 321 transforms and generates a conventional mass spectrum as shown in FIG. 6 in the manner shown in FIGS. 2 through 5. The mass spectrum display method in the present invention can be broadly divided into two types: the method of making the mass axis into a ring shape (FIG. 2) and the method of orienting the mass axis in the vertical direction of the screen (FIGS. 3 through 5).

The peak information acquisition unit 322 acquires peak information relating to the peaks of the mass spectrum through various computations, referencing the library 33, from analysis data at various stages of cleavage, etc. For example, the mass spectrum in FIGS. 2 through 5 is an $MS^n$ spectrum obtained by cleaving the precursor ion in the drawing, and the peak information for each peak consists of structural formula candidates for each fragment ion determined through calculation based on known structural formulas of the precursor ions, and ion names (in the drawing, indicated for expediency as "compounds A through E") acquired by searching the mass library. In addition to the structural formula candidates and corresponding compound names mentioned above, the peak information acquired by the peak information acquisition unit 322 may also include the accurate mass, intensity, an evaluation value computed by a predetermined evaluation method, neutral loss from the precursor ion, measured $MS^{n+1}$ spectrum, etc.

The data display unit 323 displays the mass spectrum generated by the transformed graph generation unit 321 and the peak data acquired by the peak information acquisition unit 322 side by side on the screen of display unit 13.

Display setting unit 324 allows various settings for displaying the mass spectrum and peak information on the screen to be made by the user via input unit 14. A specific description of display setting unit 324 will be presented later.

The mass spectrum and peak information displayed on the screen by display program 32 will be described with reference to FIGS. 2 through 5.

Display Example 1

Figure 2:
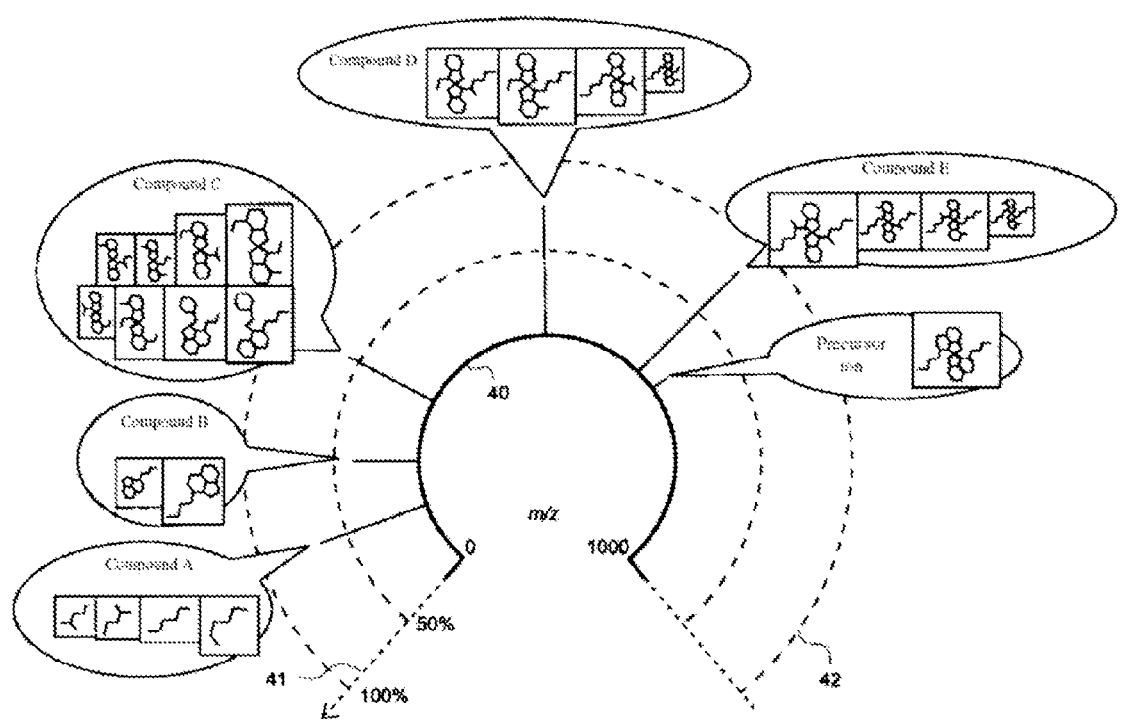
FIG. 2 A mass spectrum and peak information display example for the mass spectrometry data display device of the present example of embodiment.

FIG. 2 shows a display example of the mass spectrum and peak information displayed on the screen by the display program 32. In this example, a mass spectrum is generated, in which the mass axis (m/z axis) 40 is made into a ring shape and the intensity axis 41 is the radial direction thereof, and is displayed together with peak information for each peak on the screen.

In the present display example, the peaks are arranged in a ring shape along the ring-shaped mass axis 40, and peak information (in the drawing, the compound name and structural formula candidates) displayed in the form of a balloon callout corresponding to each peak are arranged in a ring shape at the outer circumference of the mass spectrum. By making the arrangement of the peaks and the layout of peak information ring shaped in this manner, peak information for multiple peaks can be displayed simultaneously without overlapping each other or the peaks.

The data display unit 323 can change the display of peak information as necessary. For example, if the peaks are clustered together, it is possible to make changes such as displaying only the peak information for representative peaks selected according to predetermined criteria (magnitude of intensity, etc.), reducing the display size, rearranging the display, etc. Furthermore, line breaks can be used as necessary.

Furthermore, when multiple candidates are displayed on the screen like the structural formula candidates, it is desirable to compute an evaluation value by a predetermined evaluation method and display the candidates with the best results closer to the peak. It is also desirable to change the display size based on the evaluation value, such as increasing the display size for candidates with better evaluation results and reducing the display size for those with poorer evaluation results.

By changing the display of the candidates based on the evaluation value in this manner, it become possible to display information for the best candidates at a location where they will be more readily noticed by the user. This makes it possible for the user to effectively select and discard the various information displayed on the screen and facilitates the evaluation of the mass spectrum.

As the evaluation method, for example, when the $MS^{n+1}$ spectrum has been measured for a given peak of an $MS^n$ spectrum, there is the method of computing the similarity between the expected $MS^{n+1}$ spectrum determined on the basis of each structural formula candidate for that peak and the measured $MS^{n+1}$ spectrum obtained through measurement, the method of computing the deviation between the accurate mass of each peak and the exact mass of each structural formula candidate, etc.

Furthermore, the user can change the display of peak information via the display setting unit 324. Parameters settable through the display setting unit 324 may include the following, for example.

(a) Setting the items of information to be displayed on the screen.

(b) Setting the display order.

(c) Filtering setting.

(d) Setting to enable/disable display of equi-intensity lines (ruled lines 42 in the drawing).

(a) is a setting parameter relating which of the various information items, such as structural formula candidates, corresponding compound names, accurate mass, evaluation value, etc. are to be displayed on the screen. (b) is a setting parameter relating to the display order of information items when multiple information items are selected in (a) and the display order of candidates when there are multiple candidates for a single information item, such as structural formula candidates. (c) is a setting parameter relating to the criteria by which candidates are to be extracted and displayed when there are multiple candidates for a single information item. (d) is a parameter for setting whether or not to display ruled equi-intensity lines 42 for comparing peak intensities of the mass spectrum on the screen.

(a) through (c) above make it possible for a user to display only the information which the user needs in a manner which is easier for the user to understand. This makes it easier to gain an overview of the overall spectrum and facilitates the evaluation of the object of analysis. Furthermore, (d) makes it possible to perform overall comparison of peak intensities and comparison limited to peak information.

Display Example 2

FIGS. 3 through 5 show another display example of mass spectrum and peak information displayed on the screen by the display program 32. These drawings are display examples of a mass spectrum in which the mass axis has been oriented in the vertical direction of the screen.

In a conventional mass spectrum, as shown in FIG. 6, the mass axis is displayed as the horizontal axis and the intensity axis as the vertical axis. By contrast, the mass spectrum of the present display example rotates the conventional mass spectrum 90° (FIG. 3), or swaps the vertical axis and horizontal axis to make the vertical axis into the mass axis and the horizontal axis into the intensity axis (FIG. 4). The peak information for each peak is displayed on either or both the left and/or right of the mass spectrum.

In the present display example, the peaks are arranged in the vertical direction of the screen, so even though peak information is displayed in horizontally long fashion, since the direction of arrangement of peaks and peak information is vertical, these will not overlap. Thus, peak information can be displayed simultaneously for multiple peaks without overlapping with other items of information or with the peaks.

FIG. 5 is a modified example of the display example of FIG. 3, in which the mass spectrum and peak information are displayed in three dimensions along the x axis, y axis and z axis. As shown in FIG. 5, the x axis is oriented in the horizontal direction of the screen, the y axis in the vertical direction of the screen and the z axis in the diagonal direction of the screen; the mass axis is oriented in the y axis direction and the intensity axis in the z axis direction. As a result, the same effect is obtained as in FIG. 3, and the area in which peak information can be displayed can be increased.

Examples of embodiment of the mass spectrometry data display device according to the present invention have been described above, but the foregoing are no more than examples, and it is obvious that modifications, adjustments or additions may be suitably made within the gist of the present invention.

DESCRIPTION OF REFERENCES

10 . . . Mass spectrometry data display device
11 . . . CPU
12 . . . Memory
13 . . . Display unit
14 . . . Input unit
15 . . . Storage unit
18 . . . I/F
19 . . . Communication line
20 . . . Mass spectrometry device
30 . . . OS 31 . . . Control/data processing program
32 . . . Mass spectrometry data display program
321 . . . Transformed graph generation unit
322 . . . Peak information acquisition unit
323 . . . Data display unit
324 . . . Display setting unit
33 . . . Library
40 . . . Mass axis
41 . . . Intensity axis
42 . . . Equi-intensity line

What is claimed is:

1. A mass spectrometry data display device which displays a mass spectrum on a screen, with one axis as a mass axis and another axis as an intensity axis, comprising:
 a transformed graph generator which generates said mass spectrum with said mass axis as a ring shape and said intensity axis in a radial direction thereof;
 a data display which displays said mass spectrum generated by said transformed graph generator, and displays peak information for peaks contained in said mass spectrum at an outer circumference of said mass spectrum in association with said peaks; and
 wherein when said peak information comprises a plurality of candidates, an evaluation value is computed for each of said plurality of candidates based on a predetermined evaluation method, and said data display displays said plurality of candidates in a sequence with a candidate among said plurality of candidates with a best evaluation value closest to a corresponding peak of said peaks.

2. A mass spectrometry data display device as described in claim 1, characterized in that said peak information contains a plurality of structural formula candidates and said evaluation method is a deviation between an accurate mass of each peak and an exact mass of each structural formula candidate among said plurality of structural formula candidates.

3. A mass spectrometry data display device as described in claim 1, characterized in that said peak information contains a plurality of structural formula candidates and said evaluation method is a similarity between a measured mass spectrum obtained by cleaving said peaks corresponding to said peak information and an expected mass spectrum obtained from each of said structural formula candidates.

4. A mass spectrometry data display device as described in claim 1, characterized in that an equi-intensity line of equal intensity is displayed on said mass spectrum.

5. A mass spectrometry data display device as described in claim 1, characterized in that a user is able to set items of said peak information to be displayed on said screen.

6. A mass spectrometry data display device as described in claim 1, characterized in that a user is able to set a display sequence of said peak information displayed on said screen.

7. A mass spectrometry data display device as described in claim 1, characterized in that, when said peak information comprises said plurality of candidates, a user can define filtering settings for extracting candidates among said plurality of candidates to be displayed on said screen.

8. A mass spectrometry data display device which displays a mass spectrum on a screen, with one axis as a mass axis and another axis as an intensity axis, comprising:
 a transformed graph generator which generates said mass spectrum with said mass axis oriented in a vertical direction of said screen and said intensity axis oriented in a horizontal direction or a diagonal direction of said screen; and
 a data display which displays said mass spectrum generated by said transformed graph generator, and displays peak information for peaks contained in said mass spectrum at a left and/or right side of said mass spectrum in association with said peaks, and when said peak information comprises a plurality of candidates, an evaluation value is computed for each of said plurality of candidates based on a predetermined evaluation method, and said data display displays said plurality of candidates in a sequence with a candidate among said plurality of candidates with a best evaluation value closest to a corresponding peak of said peaks.

9. A mass spectrometry data display device as described in claim 8, characterized in that said peak information contains a plurality of structural formula candidates and said evaluation method is a deviation between an accurate mass of each peak and an exact mass of each structural formula candidate among said plurality of structural formula candidates.

10. A mass spectrometry data display device as described in claim 8, characterized in that said peak information contains a plurality of structural formula candidates and said evaluation method is a similarity between a measured mass spectrum obtained by cleaving said peaks corresponding to said peak information and an expected mass spectrum obtained from each of said structural formula candidates.

11. A mass spectrometry data display device as described in claim 8, characterized in that an equi-intensity line of equal intensity is displayed on said mass spectrum.

12. A mass spectrometry data display device as described in claim 8, characterized in that a user is able to set items of said peak information to be displayed on said screen.

13. A mass spectrometry data display device as described in claim 8, characterized in that a user is able to set a display sequence of said peak information displayed on said screen.

14. A mass spectrometry data display device as described in claim 8, characterized in that, when said peak information comprises said plurality of candidates, a user can define filtering settings for extracting candidates among said plurality of candidates to be displayed on said screen.

15. A non-transitory computer readable medium including a mass spectrometry data display program for making a computer function according to a method, comprising:
 generating a mass spectrum with a mass axis as a ring shape and an intensity axis in a radial direction thereof; and
 displaying said mass spectrum, and displaying peak information for peaks contained in said mass spectrum at an outer circumference of said mass spectrum in association with said peaks;
 wherein when said peak information comprises a plurality of candidates, computing an evaluation value for each of said plurality of candidates based on a predetermined evaluation method, and displaying said plurality of candidates in a sequence with a candidate among said plurality of candidates with a best evaluation value closest to a corresponding peak of said peaks.

16. A non-transitory computer readable medium including a mass spectrometry data display program for making a computer function according to a method, comprising:
 generating a mass spectrum with a mass axis oriented in a vertical direction of said screen and an intensity axis oriented in a horizontal direction or a diagonal direction of said screen; and displaying said mass spectrum, and displaying peak information for peaks contained in said mass spectrum at a left and/or right side of said mass spectrum in association with said peaks, and when said peak information comprises a plurality of candidates, computing an evaluation value for each of said plurality of candidates based on a predetermined evaluation method, and displaying said plurality of candidates in a sequence with a candidate among said plurality of candidates with a best evaluation value closest to a corresponding peak of said peaks.

17. A mass spectrometry data display device which displays a mass spectrum on a screen, with one axis as a mass axis and another axis as an intensity axis, comprising:
   a transformed graph generator which generates said mass spectrum with said mass axis oriented in a vertical direction of said screen and said intensity axis oriented in a horizontal direction or a diagonal direction of said screen; and
   a data display which displays said mass spectrum generated by said transformed graph generator, and displays peak information for peaks contained in said mass spectrum at a left and/or right side of said mass spectrum in association with said peaks, and when said peak information comprises a plurality of candidates, an evaluation value is computed for each of said plurality of candidates based on a predetermined evaluation method, and
   said data display displays candidates having a better evaluation value at a larger size and candidates with a poorer evaluation value at a smaller size.

18. A mass spectrometry data display device which displays a mass spectrum on a screen, with one axis as a mass axis and another axis as an intensity axis, comprising:
   a transformed graph generator which generates said mass spectrum with said mass axis as a ring shape and said intensity axis in a radial direction thereof;
   a data display which displays said mass spectrum generated by said transformed graph generator, and displays peak information for peaks contained in said mass spectrum at an outer circumference of said mass spectrum in association with said peaks; and
   wherein when said peak information comprises a plurality of candidates, an evaluation value is computed for each of said plurality of candidates based on a predetermined evaluation method, and
   said data display displays candidates having a better evaluation value at a larger size and candidates with a poorer evaluation value at a smaller size.

* * * * *